US011348615B2

(12) United States Patent
Anno et al.

(10) Patent No.: US 11,348,615 B2
(45) Date of Patent: May 31, 2022

(54) CARTRIDGE MEMORY FOR MAGNETIC TAPE CARTRIDGE, CONTROL METHOD THEREFOR, CARTRIDGE, AND RECORDING/REPRODUCTION SYSTEM

(71) Applicant: Sony Corporation, Tokyo (JP)

(72) Inventors: Kazuo Anno, Miyagi (JP); Takanobu Iwama, Miyagi (JP); Shinya Tochikubo, Miyagi (JP); Eiji Nakashio, Miyagi (JP); Naohiro Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/957,295

(22) PCT Filed: Oct. 21, 2019

(86) PCT No.: PCT/JP2019/041378
§ 371 (c)(1),
(2) Date: Jun. 23, 2020

(87) PCT Pub. No.: WO2020/085328
PCT Pub. Date: Apr. 30, 2020

(65) Prior Publication Data
US 2021/0383836 A1 Dec. 9, 2021

(30) Foreign Application Priority Data
Oct. 24, 2018 (JP) .............................. JP2018-199942

(51) Int. Cl.
*G11B 5/584* (2006.01)
*G11B 20/18* (2006.01)
(Continued)

(52) U.S. Cl.
CPC ...... *G11B 20/1833* (2013.01); *G11B 5/00813* (2013.01); *G11B 15/6895* (2013.01);
(Continued)

(58) Field of Classification Search
None
See application file for complete search history.

(56) References Cited

U.S. PATENT DOCUMENTS 6,421,196 B1 * 7/2002 Takayama .......... G11B 23/0233
340/5.8
6,614,610 B1 * 9/2003 Takayama ............. G06F 3/0613
360/69
(Continued)

FOREIGN PATENT DOCUMENTS

JP    2002-150742    5/2002
JP    2002150742 A    5/2002
(Continued)

OTHER PUBLICATIONS

Computer translation of JP 2015-133602, Jul. 23, 2015.*
International Search Report issued in Application No. PCT/JP2019/041378, dated Dec. 10, 2019.

*Primary Examiner* — Tan X Dinh
(74) *Attorney, Agent, or Firm* — K&L Gates LLP

(57) ABSTRACT

A cartridge memory is a cartridge memory used in a magnetic tape cartridge, including: an antenna unit; a storage unit that stores data; and a control unit that reads the data from the storage unit in response to a request from a recording/reproduction apparatus, adds an error correction code to the data, and transmits the obtained data via the antenna unit.

14 Claims, 7 Drawing Sheets

(51) Int. Cl.
*G11B 5/008* (2006.01)
*G11B 15/68* (2006.01)
*H01Q 1/24* (2006.01)
*G11B 5/588* (2006.01)

(52) U.S. Cl.
CPC ............ *H01Q 1/248* (2013.01); *G11B 5/584* (2013.01); *G11B 5/588* (2013.01)

(56) References Cited

U.S. PATENT DOCUMENTS

| | | | | |
|---|---|---|---|---|
| 6,621,650 | B1* | 9/2003 | Takayama | G11B 5/0086 360/48 |
| 6,643,086 | B1* | 11/2003 | Hiramoto | G11B 15/06 360/69 |
| 6,674,596 | B1* | 1/2004 | Takayama | G11B 20/00876 |
| 7,209,308 | B2* | 4/2007 | Takayama | G11B 20/10 360/69 |
| 7,339,759 | B2* | 3/2008 | Hashimoto | G11B 20/1833 360/31 |
| 10,665,259 | B1* | 5/2020 | Yamaga | G11B 5/70 |
| 11,107,505 | B2* | 8/2021 | Nakashio | G11B 5/00817 |
| 2002/0105749 | A1* | 8/2002 | Hirooka | G11B 15/07 360/69 |
| 2003/0002214 | A1 | 1/2003 | Kitamura et al. | |
| 2003/0089809 | A1* | 5/2003 | Maekawa | G11B 15/07 242/332.4 |
| 2003/0179485 | A1* | 9/2003 | Kato | G11B 23/08714 360/69 |
| 2004/0114266 | A1* | 6/2004 | Urano | G11B 27/11 360/69 |
| 2004/0190178 | A1* | 9/2004 | Kato | G11B 23/283 360/69 |
| 2004/0190179 | A1* | 9/2004 | Kato | G11B 27/11 360/69 |
| 2005/0018342 | A1* | 1/2005 | Kato | G11B 27/107 360/69 |
| 2007/0036237 | A1 | 2/2007 | Kobayashi et al. | |
| 2008/0180829 | A1 | 7/2008 | Tokunaka et al. | |
| 2008/0218901 | A1* | 9/2008 | Haustein | G11B 23/107 360/90 |
| 2014/0143796 | A1* | 5/2014 | Chiba | G11B 23/107 720/725 |
| 2016/0179417 | A1* | 6/2016 | Fasen | G06F 3/0619 360/75 |
| 2016/0329638 | A1 | 11/2016 | Kanno | |
| 2020/0357434 | A1* | 11/2020 | Yamaga | G11B 5/66 |
| 2021/0027803 | A1* | 1/2021 | Adachi | G11B 20/1803 |
| 2021/0233567 | A1* | 7/2021 | Tochikubo | G11B 23/30 |
| 2021/0312947 | A1* | 10/2021 | Iwahashi | G11B 23/107 |

FOREIGN PATENT DOCUMENTS

| | | |
|---|---|---|
| JP | 2002-189994 | 7/2002 |
| JP | 2002189994 A | 7/2002 |
| JP | 2003-109353 | 4/2003 |
| JP | 2003109353 A | 4/2003 |
| JP | 2007-151077 | 6/2007 |
| JP | 2007151077 A | 6/2007 |
| JP | 2008-186499 | 8/2008 |
| JP | 2008186499 A | 8/2008 |
| JP | 2011-146822 | 7/2011 |
| JP | 2011146822 A | 7/2011 |
| JP | 2015-091063 | 5/2015 |
| JP | 2015091063 A | 5/2015 |
| JP | 2015-133602 | 7/2015 |
| JP | 2015133602 A | 7/2015 |

* cited by examiner

CARTRIDGE MEMORY FOR MAGNETIC TAPE CARTRIDGE, CONTROL METHOD THEREFOR, CARTRIDGE, AND RECORDING/REPRODUCTION SYSTEM

TECHNICAL FIELD

The present disclosure relates to a cartridge memory, a control method therefor, a cartridge, and a recording/reproduction system.

BACKGROUND ART

Magnetic recording media are widely used for storing electronic data. In particular, magnetic tapes with a low cost per data unit capacity are attracting attention again, and are used in data centers or the like together with HDDs (Hard Disk Drives) as recording media used in cloud storage services.

Of the magnetic tapes, a magnetic tape conforming to the Linier Tape Open (LTO) Ultrium standard is widely used. A non-contact type non-volatile memory using RF wireless communication, which is called a cartridge memory (CM), is built in the tape cartridge conforming to the LTO Ultium standard (see, for example, Patent Literature 1). To the cartridge memory, for example, data such as production information, drive usage history, and vendor-specific management information is written. After the cartridge is loaded into a drive, the drive reads the above-mentioned data from the cartridge memory, thereby making it possible to check the usage status and the like of the cartridge.

CITATION LIST

Patent Literature

Patent Literature 1: Japanese Patent Application Laid-open No. 2003-109353

DISCLOSURE OF INVENTION

Technical Problem

In recent years, as the recording density of the magnetic tape has increased, the content of track information to be stores has been increasing and also the capacity of the cartridge memory has tended to increase. For this reason, the amount of data exchanged between the cartridge memory and the drive tends to increase, and it is desired to increase the data transfer speed and shorten the data transfer time. However, in the case where the data transfer speed is simply increased, there is a possibility that the S/N (Signal-noise Ratio) deteriorates and the important data integrity of the cartridge memory is reduced. For this reason, it is desired to improve the noise resistance and suppress the reduction in data integrity.

It is an object of the present disclosure to provide a cartridge memory, a control method therefor, a cartridge, and a recording/reproduction system, which are capable of improving the noise resistance.

Solution to Problem

In order to achieve the above-mentioned object, a first disclosure is a cartridge memory used in a magnetic tape cartridge, including: an antenna unit; a storage unit that stores data; and a control unit that reads the data from the storage unit in response to a request from a recording/reproduction apparatus, adds an error correction code to the data, and transmits the obtained data via the antenna.

A second disclosure is a magnetic tape cartridge including the cartridge memory according to the first disclosure.

A third disclosure is a recording/reproduction system, including: a magnetic tape cartridge including the cartridge memory according to the first disclosure; and a recording/reproduction apparatus that records/reproduces the magnetic tape cartridge.

A fourth disclosure is a method of controlling a cartridge memory used in a magnetic tape cartridge, including: reading data from a storage unit in response to a request from a recording/reproduction apparatus; and adding an error correction code to the data, and transmitting the obtained data via an antenna unit.

A fifth disclosure is a cartridge memory used in a recording medium cartridge, including: an antenna unit; a storage unit that stores data; and a control unit that reads the data from the storage unit in response to a request from a recording/reproduction apparatus, adds an error correction code to the data, and transmits the obtained data via the antenna unit.

MODE(S) FOR CARRYING OUT THE INVENTION

Embodiments of the present disclosure will be described in the following order.
1 First Embodiment (Example of Recording/Reproduction System, cartridge, and Cartridge Memory)
2 Second Embodiment (Example of Recording/Reproduction System, Cartridge, and Cartridge Memory)

1 First Embodiment

Figure 1:
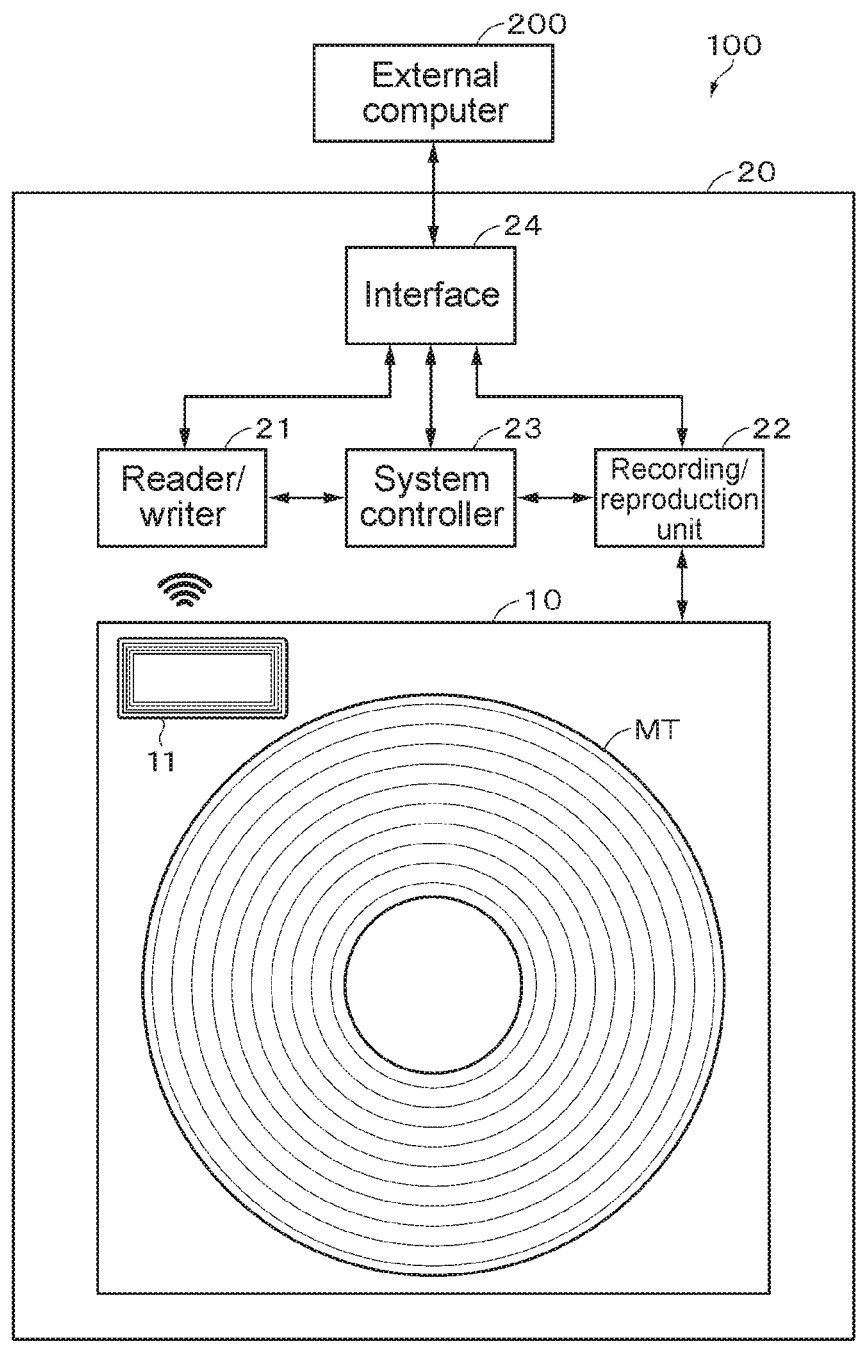
FIG. 1 is a schematic diagram showing an example of a configuration of a recording/reproduction system according to a first embodiment of the present disclosure.

[Configuration of Recording/Reproduction System]
FIG. 1 shows an example of a configuration of a recording/reproduction system 100 according to a first embodiment of the present disclosure. The recording/reproduction system 100 is a magnetic tape recording/reproduction system, and includes a cartridge 10 and a recording/reproduction apparatus 20, the cartridge 10 including a magnetic tape MT and a cartridge memory 11, the recording/reproduction apparatus 20 being configured to be capable of loading and unloading the cartridge 10.

Data transfer between the recording/reproduction apparatus 20 and the cartridge memory 11 in the state where the cartridge 10 has been loaded into the recording/reproduction apparatus 20 is performed in a normal-speed communication mode (first communication mode) or a the high-speed communication mode (second communication mode).

The frequency of the radio wave used in the normal-speed communication mode is, for example, 13.56 MHz. Meanwhile, the frequency of the radio wave used in the high-speed communication mode is, for example, larger than 13.56 MHz and is favorably 13.56×n(n: integer of 2 or more).

The normal-speed communication mode is a communication mode for transferring data at a normal communication speed (first communication speed). The high-speed communication mode is a communication mode for transferring data at a high communication speed (second communication speed) higher than the normal communication speed. No error correction code is added to the transfer data in the normal-speed communication mode, but an error correction code is added to the transfer data in the high-speed communication mode. As the error correction code to be added to the transfer data, for example, a Hamming code, a horizontal/vertical parity code, a Reed-Solomon code, a BCH code, or the like can be used. However, the present disclosure is not limited to these codes.

[Configuration of Recording/Reproduction Apparatus]

The recording/reproduction apparatus 20 is a so-called magnetic tape drive, and includes a reader/writer 21 as a communication unit, a recording/reproduction unit 22, a system controller 23 as a control unit, and an interface 24. The recording/reproduction apparatus 20 is connected to an external computer 200 via the interface 24.

The reader/writer 21 communicates with the cartridge memory 11 in accordance with a specified wireless communication standard. Here, the specified communication standard is, for example, a communication standard (hereinafter, referred to as "the communication standard in the LTO standards") defined for the cartridge memory 11 in the LTO (Linear Tape-Open) standards.

The communication standard in the LTO standards is a short-range wireless communication standard customized for LTO on the basis of ISO14443-2 Type A (NXP). Note that the LTO standard may be any of LTO1 to LTO8, or may be LTO9 or any of subsequent standards expected to be formulated in the future.

The recording/reproduction unit 22 includes a motor (not shown) for causing the magnetic tape MT to travel, a head unit (not shown), and the like, records data on the magnetic tape MT, and reproduces the data.

The interface 24 is connected to the recording/reproduction unit 22 and the external computer 200. The signal read from the magnetic tape MT by the recording/reproduction unit 22 is output to the external computer 200 via the interface 24. Meanwhile, the signal to be recorded on the magnetic tape MT by the recording/reproduction unit 22 is supplied from the external computer 200 via the interface 24.

The interface 24 may be connected to the reader/writer 21. In this case, the reader/writer 21 may be controlled by an operation input from the external computer 200 connected to the interface 24.

The system controller 23 controls the respective units of the recording/reproduction apparatus 20 such as the reader/writer 21 and the recording/reproduction unit 22. The system controller 23 includes a CPU (Central Processing Unit), a ROM (Read Only Memory), a RAM (Random Access Memory), and the like (which are not shown).

The system controller 23 requests the cartridge memory 11 to switch the communication mode via the interface 24. Specifically, the system controller 23 inquires the cartridge memory 11 via the interface 24 about whether or not communication is possible in the high-speed communication mode. In the case where there has been a reply that communication is possible in the high-speed communication mode from the cartridge memory 11 in response to the inquiry, the system controller 23 requests the cartridge memory 11 to switch the mode from the normal-speed communication mode to the high-speed communication mode, and performs data transfer in the high-speed communication mode thereafter. Meanwhile, in the case where there has been no reply from the cartridge memory 11 in response to the inquiry or in the case where there has been a reply that communication is not possible in the high-speed communication mode from the cartridge memory 11 in response to the inquiry, the system controller 23 maintains the normal-speed communication mode.

In the case of transmitting data to the cartridge memory 11 in the normal communication mode, the system controller 23 transmits data at a normal communication speed via the reader/writer 21 without adding an error correction code to the data supplied from the external computer 200 via the interface 24. In the case of receiving data from the cartridge memory 11 via the reader/writer 21 in the normal communication mode, the system controller 23 supplies the received data to the external computer 200 via the interface 24.

In the case of transmitting data to the cartridge memory 11 in the high-speed communication mode, the system controller 23 generates an error correction code for the data supplied from the external computer 200 via the interface 24, adds the error correction code to the supplied data, and transmits the obtained data to the cartridge memory 11 at a high communication speed via the reader/writer 21. Note that the error correction code is added, for example, in block units. In the case of receiving the data to which an error correction code has been added from the cartridge memory 11 via the reader/writer 21 in the high-speed communication mode, the system controller 23 tries to detect an error (code error) of the received data by using the error correction code added to the data, corrects, if an error has been detected, the error and then, supplies the obtained data to the external computer 200 via the interface 24. At this time, the system controller 23 does not necessarily need to perform error correction on the received data, and may supply the data to which an error correction code has been added to the external computer 200 without any change.

[Configuration of Cartridge]

Figure 2:
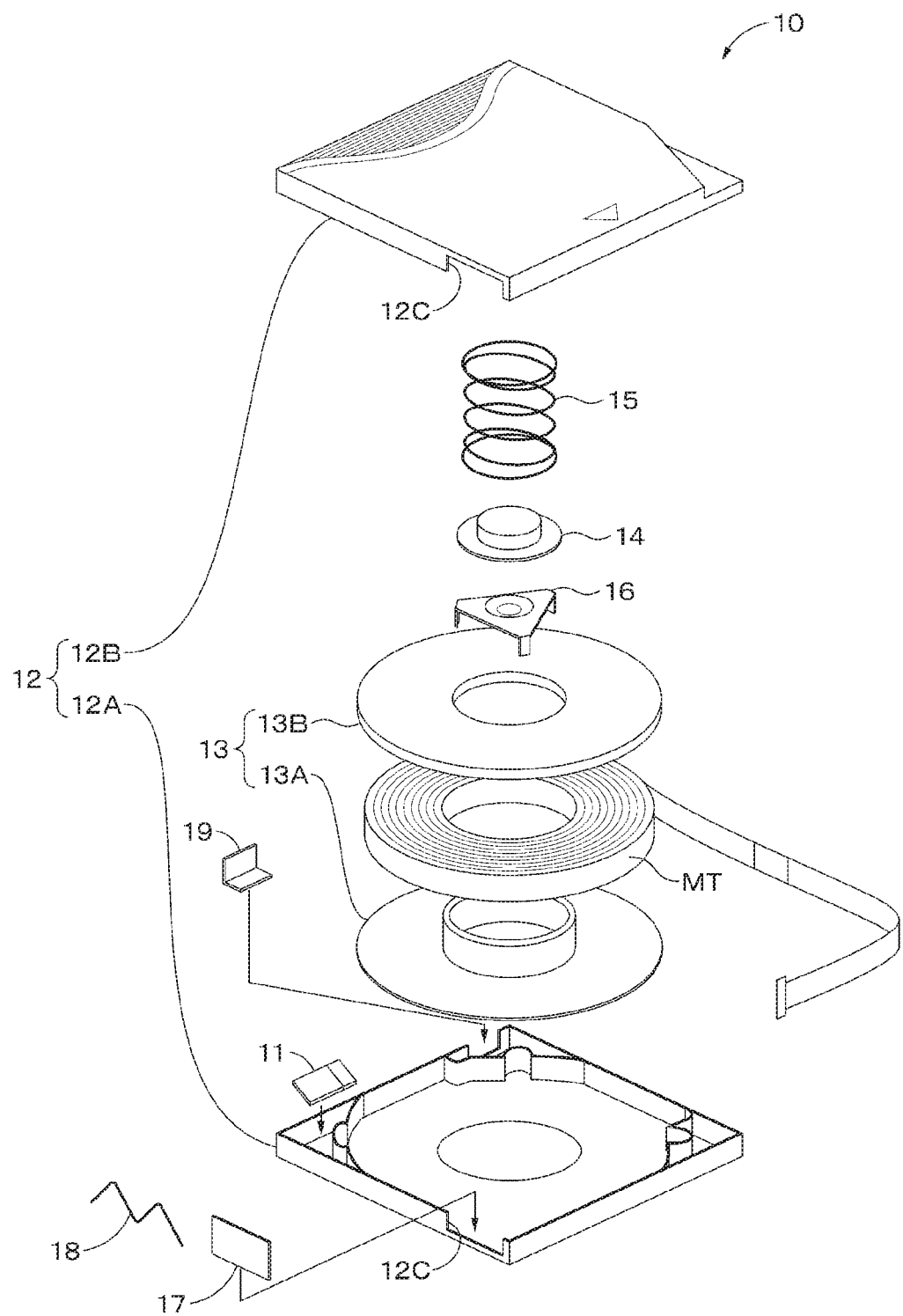
FIG. 2 is an exploded perspective view showing an example of a configuration of a cartridge.

FIG. 2 shows an example of a configuration of the cartridge 10. The cartridge 10 is a magnetic tape cartridge (recording medium cartridge) conforming to the LTO standard, and includes, inside a cartridge case 12 including a lower shell 12A and an upper shell 12B, a reel 13 on which the magnetic tape MT is wound, a reel lock 14 and a reel spring 15 for locking the rotation of the reel 13, a spider 16 for releasing the locked state of the reel 13, a slide door 17 that opens/closes a tape outlet 12C provided across the lower shell 12A and the upper shell 12B in the cartridge case 12, a door spring 18 that urges the slide door 17 to the closed position of the tape outlet 12C, a write protect 19 for preventing erroneous erasure, and the cartridge memory 11.

The reel 13 has a substantially disk shape having an opening at the center, and includes a reel hub 13A and a flange 13B, which are formed of a hard material such as plastic.

The cartridge memory 11 is provided in the vicinity of one corner of the cartridge 10. The cartridge memory 11 faces the reader/writer 21 of the recording/reproduction apparatus 20 in the state where the cartridge 10 is loaded into the recording/reproduction apparatus 20. The cartridge memory 11 communicates with the recording/reproduction apparatus 20, specifically, the reader/writer 21 in accordance with the specified wireless communication standard as described above.

[Configuration of Magnetic Tape]

Figure 3:
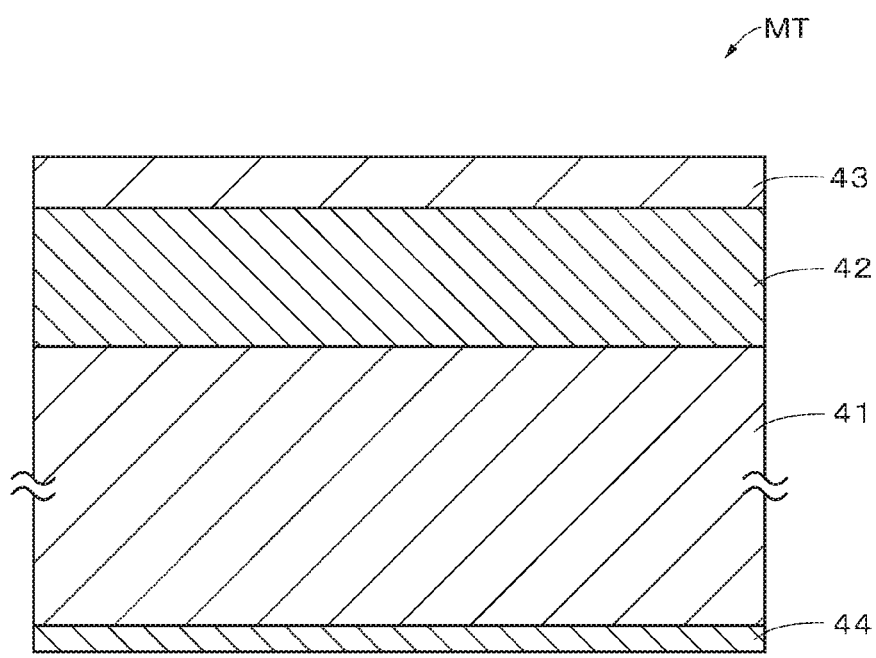
FIG. 3 is a cross-sectional view showing an example of a configuration of a magnetic tape.

FIG. 3 shows an example of a configuration of the magnetic tape MT. The magnetic tape MT is a so-called coating type magnetic tape, and includes a long substrate 41, an underlayer 42 provided on one main surface of the substrate 41, and a magnetic layer 43 provided on the underlayer 42. Note that the underlayer 42 is provided as necessary, and does not necessarily need to be provided. The magnetic tape MT may further include a backcoat layer 44 provided on the other main surface of the substrate 41 as necessary.

(Substrate)

The substrate 41 that is a support body is a long non-magnetic substrate having flexibility. The non-magnetic substrate is a film, and the thickness of the film is, for example, 3 µm or more and 8 µm or less. As the material of the substrate 41, for example, polyesters such as polyethylene terephthalate and polyethylene naphthalate, polyolefins such as polyethylene and polypropylene, cellulose derivatives such as cellulose triacetate, cellulose diacetate, and cellulose butyrate, vinyl resins such as polyvinyl chloride and polyvinylidene chloride, plastics such as polycarbonate, polyamide, polyimide, and polyamide-imide, light metals such as aluminum alloys and titanium alloys, and ceramics such as alumina glass can be used.

(Magnetic Layer)

The magnetic layer 43 is a recording layer for recording a signal. The magnetic layer 43 favorably has magnetic anisotropy in the vertical direction. That is, the axis of easy magnetization of the magnetic layer 43 is favorably oriented in the vertical direction. The magnetic layer 43 favorably has a plurality of servo bands and a plurality of data bands in advance. The plurality of servo bands is provided at equal intervals in the width direction of the magnetic tape MT. A data band is provided between adjacent servo bands. A servo signal for controlling the tracking of the magnetic head is written to the servo band in advance. User data is recorded on the data band.

The magnetic layer 43 contains, for example, a magnetic powder and a binder. The magnetic layer 43 may further contain, as necessary, at least one additive such as a lubricant, conductive particles, an abrasive, and a rust inhibitor.

The magnetic powder is favorably oriented in the thickness direction (vertical direction) of the magnetic tape MT. The magnetic powder contains, for example, ε-iron oxide particles, Co-containing spinel ferrite particles, hexagonal ferrite particles (e.g., barium ferrite particles), or the like.

As the binder, a resin having a structure obtained by causing a crosslinking reaction in a polyurethane resin, a vinyl chloride resin, or the like is favorable. However, the binder is not limited thereto, and other resins may be appropriately formulated in accordance with the physical properties required for the magnetic tape MT, or the like. The resin to be formulated is not particularly limited as long as it is a resin generally used in a coating type magnetic tape.

For example, at least one of polyvinyl chloride, polyvinyl acetate, a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinyl chloride-vinylidene chloride copolymer, a vinyl chloride-acrylonitrile copolymer, an acrylate-acrylonitrile copolymer, an acrylate-vinylidene chloride copolymer, a methacrylate-vinylidene chloride copolymer, a methacrylate-vinyl chloride copolymer, a methacrylate-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, and nitrocellulose), a styrene butadiene copolymer, a polyester resin, an amino resin, synthetic rubber, or the like can be used.

The average thickness of the magnetic layer 43 is favorably 30 nm or more and 120 nm or less, and more favorably 50 nm or more and 70 nm or less. The average thickness of the magnetic layer 43 is obtained by measuring the thickness of the magnetic layer 43 at least 10 points in the longitudinal direction of the magnetic tape MT from a cross-sectional TEM (Transmission Electron Microscope) image and then simply averaging (arithmetic averaging) the measured values.

(Underlayer)

The underlayer 42 is for alleviating the unevenness on the surface of the substrate 41 and adjusting the unevenness of the surface of the magnetic layer 43. The underlayer 42 is a non-magnetic layer containing a non-magnetic powder and a binder. The underlayer 42 may further contain, as necessary, at least one additive such as a lubricant, an antistatic agent, a curing agent, and a rust inhibitor.

The non-magnetic powder may be an inorganic substance or an organic substance. Further, the non-magnetic powder may be carbon black or the like. As the inorganic substance, for example, at least one of a metal, metal oxide, metal carbonate, metal sulfate, metal nitride, metal carbide, metal sulfide, or the like can be used. Examples of the shape of the non-magnetic powder include, but not limited to, various shapes such as a needle shape, a spherical shape, a cubic shape, and a plate shape. The binder is similar to that of the magnetic layer 43 described above.

The average thickness of the underlayer 42 is favorably 0.5 µm or more and 2.0 µm or less, and more favorably 0.6 µm or more and 1.4 µm or less. The average thickness of the underlayer 42 is obtained in a way similar to that of the average thickness of the magnetic layer 43.

[Configuration of Cartridge Memory]

Figure 4:
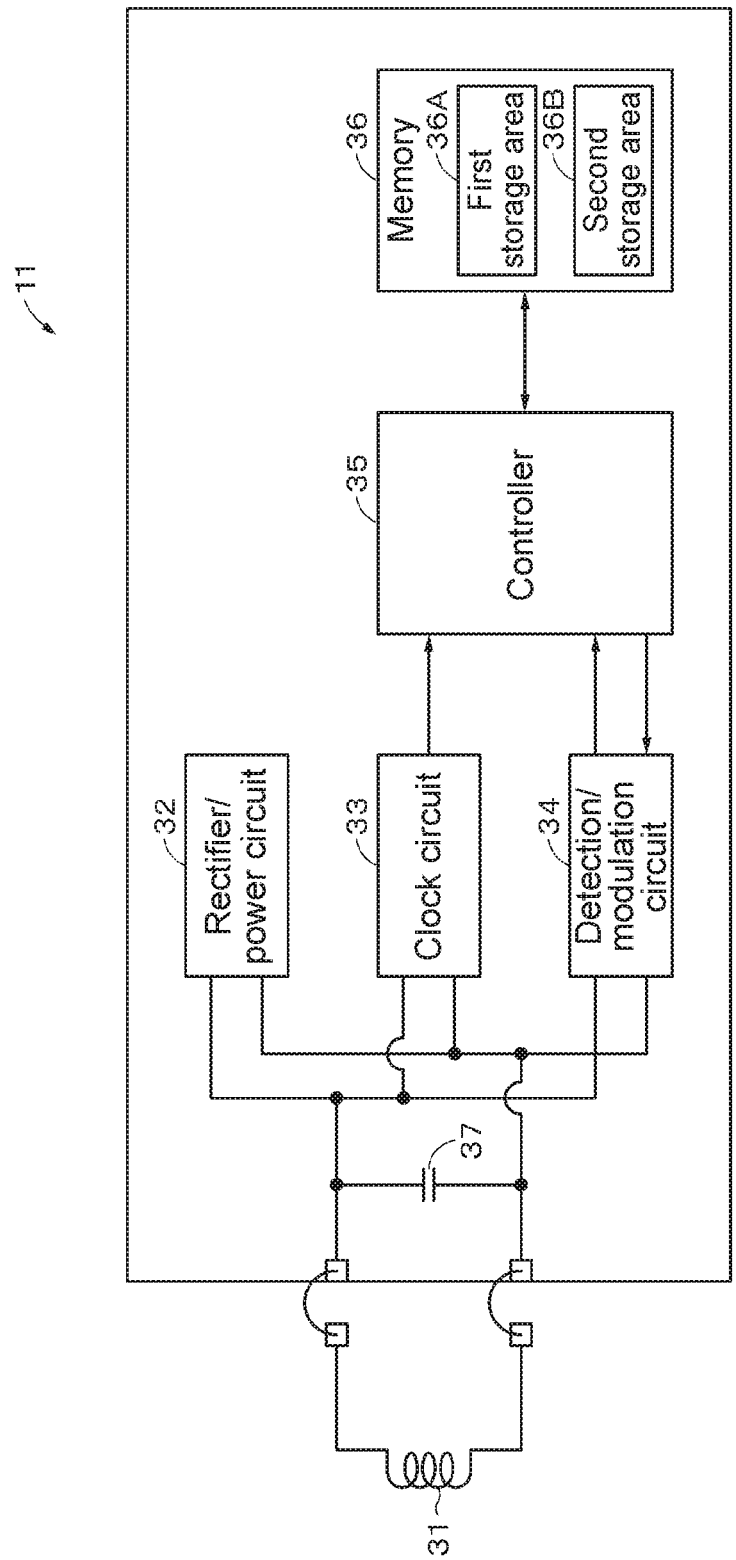
FIG. 4 is a block diagram showing an example of a configuration of a cartridge memory.

FIG. 4 shows an example of a configuration of the cartridge memory 11 used in the cartridge 10. The cartridge memory 11 includes an antenna coil (antenna unit) 31, a rectifier/power circuit 32, a clock circuit 33, a detection/modulation circuit 34, a controller (control unit) 35, and a memory 36, the antenna coil 31 communicating with the reader/writer 21 a specified communication standard, the rectifier/power circuit 32 generating power from the radio wave received by the antenna coil 31 using induced electromotive force and rectifying the power to generate power supply, the clock circuit 33 generating a clock from the radio wave received by the antenna coil 31 using induced electromotive force similarly, the detection/modulation circuit 34 detecting the radio wave received by the antenna coil 31 and modulating the signal transmitted by the antenna coil 31, the controller 35 including a logic circuit and the like for determining a command and data from the digital signal extracted from the detection/modulation circuit 34 and processing them, the memory 36 storing data.

Further, the cartridge memory 11 includes a capacitor 37 connected to the antenna coil 31 in parallel, and the antenna coil 31 and the capacitor 37 constitutes a resonance circuit. A high induced voltage can be obtained by adjusting the resonance frequency $f(=1/2\pi\sqrt{LC})$ determined by an inductance L of the antenna coil 31 and a capacitance C of the capacitor 37 to the frequency (e.g., 13.56 MHz in the normal-speed communication mode and 13.56×n(n: integer of 2 or more) in the high-speed communication mode) of the radio wave transmitted from the reader/writer 21.

The memory 36 stores data relating to the cartridge 10. The memory 36 is a non-volatile memory (NVM). The storage capacity of the memory 36 is favorably approximately 16 KB or more, and more favorably approximately 32 KB or more. For example, In the case where the cartridge 10 conforms to the LTO-6 standard, the LTO-7 standard, or the LTO-8 standard, the memory 36 has the storage capacity of approximately 16 KB. In the case where the cartridge 10 conforms to the LTO-9 standard or the LTO-10 standard, the memory 36 has the storage capacity of approximately 32 KB.

The memory 36 may have a first storage area 36A and a second storage area 36B. The first storage area 36A is an area in which data that conforms to the LTO standard (i.e., data of a general cartridge memory), and corresponds to a storage area of a general cartridge memory that conforms to the LTO standard. Examples of the data that conforms to the LTO standard includes production information (e.g., a unique number of the cartridge 10), usage history (e.g., a tape withdrawal count (Thread Count)), or the like.

The second storage area 36B corresponds to an extended storage area for a storage area of a general cartridge memory. Additional data is stored in the second storage area 36B. Here, the additional data means data relating to the cartridge 10 that is not defined in the LTO standard. Examples of the additional data include, but not limited to, an error correction code relating to the data stored in the first storage area 36A, management ledger data, Index information, and thumbnail information of a moving image stored in the magnetic tape MT.

The memory 36 may include a plurality of banks. In this case, some of the plurality of banks may configure the first storage area 36A, and the remaining banks may configure the second storage area 36B. Specifically, for example, in the case where the cartridge 10 conforms to the LTO-8 standard, each of the banks has the storage capacity of 16 KB, one of the plurality of banks may configure the first storage area 36A, and the remaining banks may configure the second storage area 36B.

The antenna coil 31 induces an induced voltage by electromagnetic induction. The controller 35 communicates with the recording/reproduction apparatus 20 via the antenna coil 31 in accordance with a specified communication standard. Specifically, for example, mutual authentication, transmission/reception of command, exchange of data, and the like are performed.

The controller 35 has the normal-speed communication mode and the high-speed communication mode, and switches between these communication modes in response to a request from the recording/reproduction apparatus 20. In the case where there has been an inquiry about whether or not communication is possible in the high-speed communication mode from the recording/reproduction apparatus 20, the controller 35 replies to the recording/reproduction apparatus 20 that communication is possible in the high-speed communication mode.

In the case of receiving data from the recording/reproduction apparatus 20 in the normal communication mode, the controller 35 stores the received data in the memory 36. In the case where there has been a request for data transmission from the recording/reproduction apparatus 20 in the normal communication mode, the controller 35 reads data corresponding to the request from the memory 36, and transmits the read data to the recording/reproduction apparatus 20 via the antenna coil 31 at a normal communication speed without adding an error correction code thereto.

In the case of receiving the data to which an error correction code has been added from the recording/reproduction apparatus 20 in the high-speed communication mode, the controller 35 tries to detect an error (code error) of the received data by using the error correction code added to the data, corrects, if an error has been detected, the error and then, stores the obtained data in the memory 36. In the case where there has been a request for data transmission from the recording/reproduction apparatus 20 in the high-speed communication mode, the controller 35 reads the data corresponding to the request from the memory 36, generates an error correction code for the read data, adds the generated error correction code to the read data, and transmits the obtained data to the recording/reproduction apparatus 20 via the antenna coil 31 at a high communication speed. Note that the error correction code is added in, for example, block units.

[Switching Operation of Communication Mode]

Figure 5:
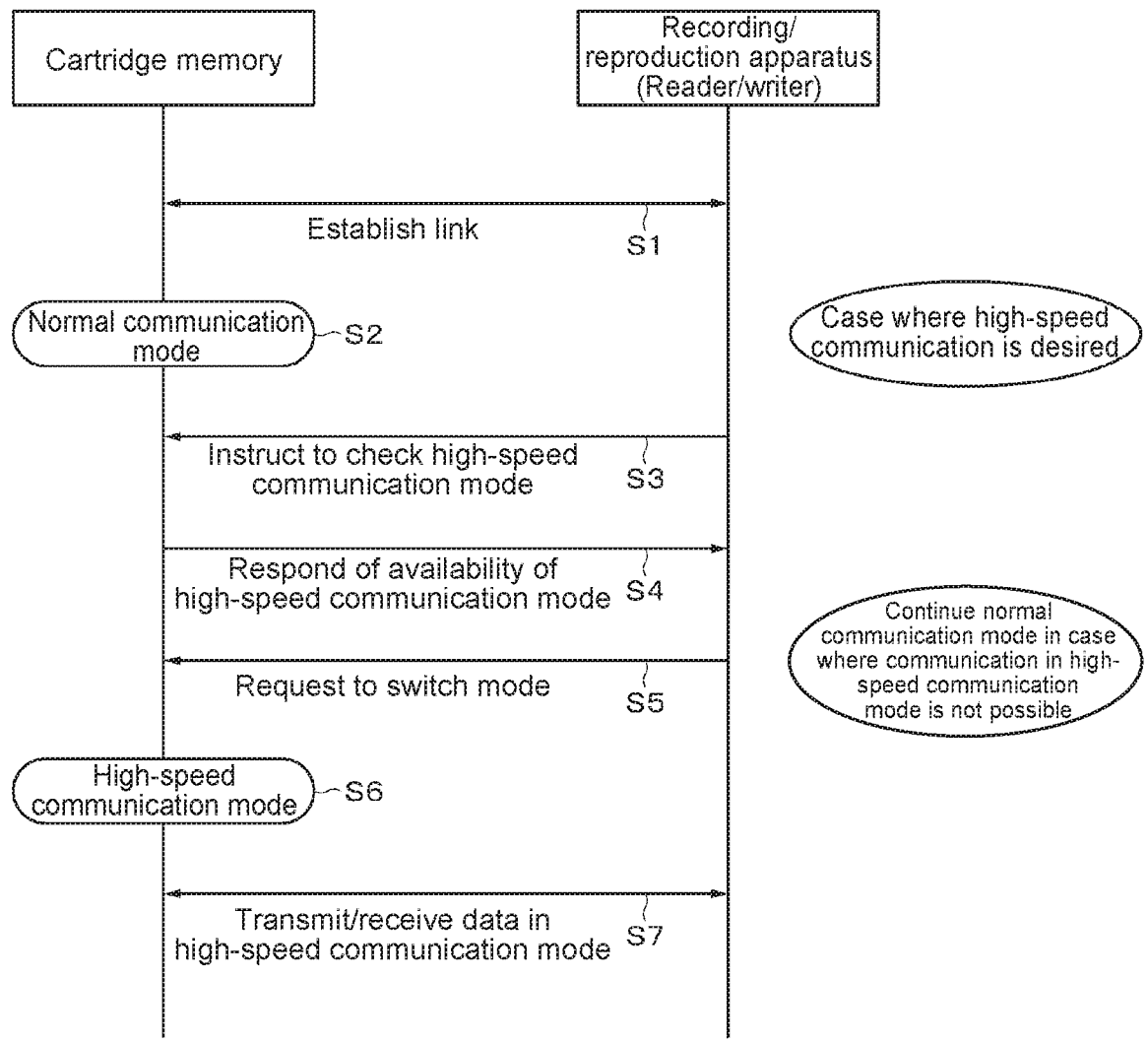
FIG. 5 is a state transition diagram for describing an example of a mode switching operation of the recording/reproduction system according to the first embodiment of the present disclosure.

Hereinafter, a mode switching operation of the recording/reproduction system 100 will be described with reference to FIG. 5. Note that in the following description, the operations of the cartridge memory 11 the recording/reproduction apparatus 20 are respectively executed by the controller 35 the system controller 23.

First, in the case where a link between the cartridge memory 11 and the recording/reproduction apparatus 20 is established (Step S1), the cartridge memory 11 sets the communication mode to the normal-speed communication mode (Step S2). After that, in the case where the recording/reproduction apparatus 20 inquires the cartridge memory 11 about communication is possible in the high-speed communication mode (Step S3), the cartridge memory 11 replies to the recording/reproduction apparatus 20 that communication is possible or not possible in the high-speed communication mode (Step S4).

In the case where there has been a reply that communication is not possible in the high-speed communication mode from the cartridge memory 11 to the recording/reproduction apparatus 20, or in the case where there has been no reply that communication is possible or not possible in the high-speed communication mode from the cartridge memory 11 to the recording/reproduction apparatus 20, the recording/reproduction apparatus 20 maintains the normal communication mode. Meanwhile, in the case where there has been a reply that communication is possible in the high-speed communication mode from the cartridge memory 11 to the recording/reproduction apparatus 20, the recording/reproduction apparatus 20 requests the cartridge memory 11 to switch the communication mode from the normal communication mode to the high-speed communication mode (Step S5). The cartridge memory 11 that has received this request switches the communication mode from the normal communication mode to the high-speed communication mode (Step S6). As a result, high-speed communication is performed between the cartridge memory 11 and the recording/reproduction apparatus 20 thereafter (Step S7). Note that in the high-speed communication mode, an error correction code is added to the data exchanged between the cartridge memory 11 and the recording/reproduction apparatus 20.

[Effect]

In the recording/reproduction system 100 according to the first embodiment, data transfer between the recording/reproduction apparatus 20 and the cartridge memory 11 is performed in the normal-speed communication mode or the high-speed communication mode. No error correction code is added to the transfer data in the normal-speed communication mode, but an error correction code is added to the transfer data in the high-speed communication mode. Therefore, it is possible to improve the noise resistance (error resistance) in the high-speed communication and suppress the reduction in data integrity.

In a general drive system, there is a possibility that an error (code error) occurs in transfer data due to the influence of noise generated during motor driving of a drive. For this reason, generally, data transfer after loading of a tape cartridge is performed before the motor is driven. Further, data transfer before unloading of a tape cartridge is performed after the driving of the motor is stopped. Therefore, a waiting time occurs in handling the cartridge during loading and unloading. In recent years, also the amount of data exchanged between the cartridge memory and the drive tends to increase, and the waiting time for handling the cartridge during loading and unloading tends to be longer. In the recording/reproduction system 100 according to the first embodiment, since data can be transferred in the high-speed communication mode during loading and unloading, it is possible to shorten the waiting time for handling the cartridge 10 during loading and unloading.

MODIFIED EXAMPLE

Modified Example 1

In the high-speed communication mode, the controller 35 may operate as follows. In the case of receiving data to which an error correction code has been added from the recording/reproduction apparatus 20 in the high-speed communication mode, the controller 35 stores, in the memory 36, the received data and the error correction code added to the received data in association with each other. At this time, processing of error correction may be performed on the data to be stored or does not necessarily need to be performed.

In the case of receiving a request for data transmission from the recording/reproduction apparatus 20 in the high-speed communication mode, the controller 35 determines whether or not an error correction code is stored in association with the data for which data transmission has been requested. In the case where it is determined that the error correction code is stored in association with the data, the controller 35 reads, from the memory 36, the data for which data transmission has been requested and the error correction code associated with the data, adds the error correction code to the read data, and transmits the obtained data to the recording/reproduction apparatus 20 at a high communication speed. Meanwhile, in the case where it is determined that an error correction code is not stored in association with the data, the controller 35 reads, from the memory 36, the data for which data transmission has been requested, generates an error correction code for the read data, adds the generated error correction code to the read data, and transmits the obtained data to the recording/reproduction apparatus 20 at a high communication speed.

The controller 35 operates as described above. As a result, since the controller 35 does not need to perform, in the case where the data for which data transmission has been requested and an error correction code have been stored in the memory 36, processing of generating an error correction code, it is possible to reduce the processing of the cartridge memory 11. Note that an error correction code may be stored in association with also the data stored in the cartridge memory 11 in advance in the above-mentioned example.

Modified Example 2

An error correction code may be added to all pieces of data to be transferred between the recording/reproduction apparatus 20 and the cartridge memory 11 regardless of the normal communication mode and the high-speed communication mode.

Modified Example 3

Figure 6:
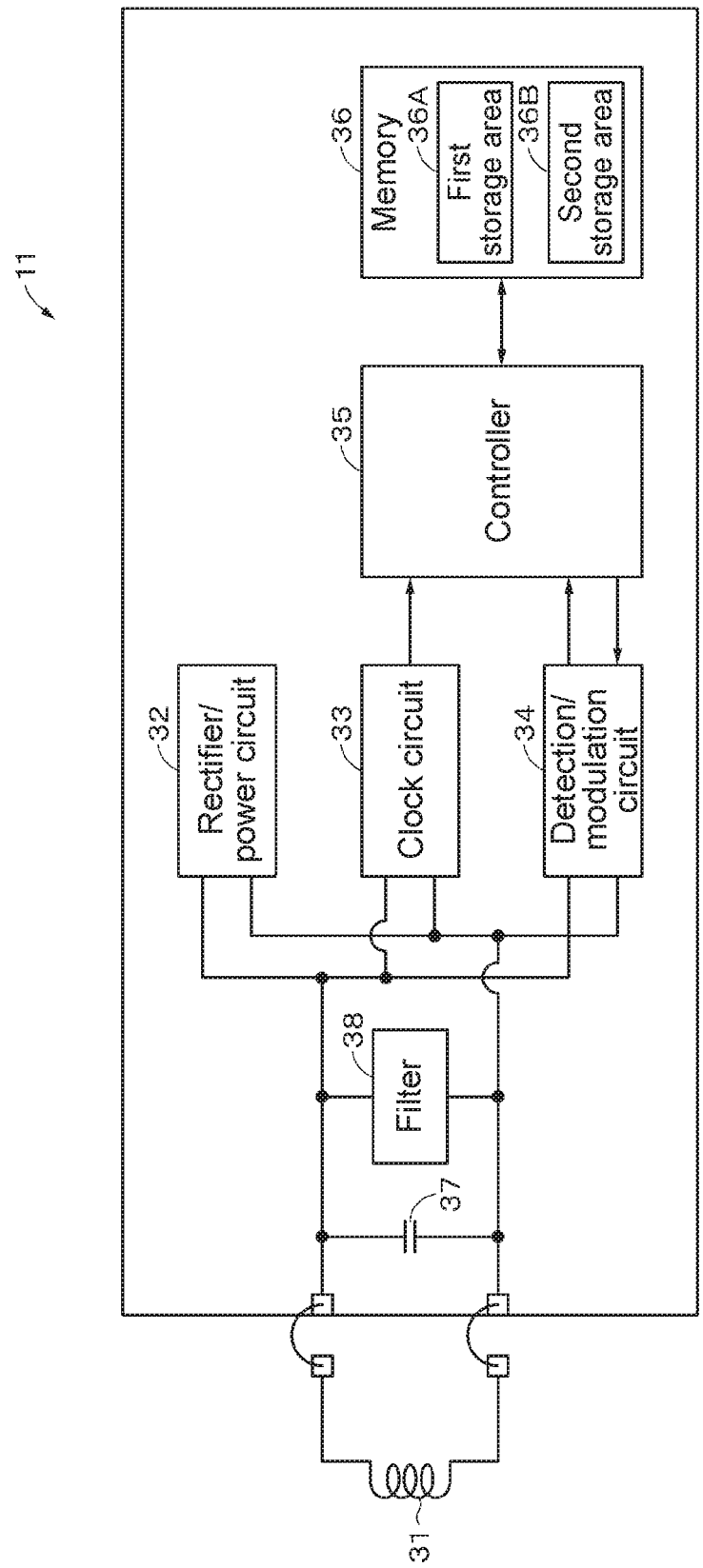
FIG. 6 is a block diagram showing a modified example of a cartridge memory.

The reader/writer 21 and the cartridge memory 11 may include a filter 38 that reduces noise of the received data, as shown in FIG. 6, instead of the processing of adding an error correction code to transmission data. Also in this case, it is possible to improve S/N of the received data and improve the noise resistance. Therefore, it is possible to reduce the influence of the noise generated from the driving motor or the like due to pulse control.

The reader/writer 21 and the cartridge memory 11 may perform the processing of adding an error correction code to transmission data and further include the above-mentioned filter 38. In this case, since the unnecessary signal components of data can be further reduced, it is possible to further improve the noise resistance.

As the filter 38, one capable of reducing the noise generated from the driving motor due to pulse control is favorable. As such a filter 38 capable of reducing the noise, one that cuts the frequency band of 10 MHz or less is favorable. Note that the system controller 23 and the controller 35 may perform filtering processing corresponding to the above-mentioned filter 38.

Modified Example 4

Data may be multiplexed in the cartridge memory 11. More specifically, the cartridge memory 11 may include a plurality of the memories 36, and each of the plurality of the memories 36 may store the same data. Alternatively, the cartridge memory 11 may have a plurality of data storage areas and each of the plurality of data storage areas may store the same data. By multiplexing data in this way, the controller 35 is capable of detect and correct missing data, of the pieces of data in the cartridge memory 11. Further, by multiplexing data, it is possible to improve also the durability of the stored data.

Modified Example 5

The cartridge memory 11 may have a capacity designation area in the memory 36, and the accessible storage area may be limited so that only the above-mentioned capacity designation area can be seen as a storage area from the recording/reproduction apparatus 20. For example, in the case where the cartridge memory 11 includes the memory 36 having the storage capacity of 32 KB, the accessible storage area may be limited so that the capacity designation area of 4 KB, 8 KB, 16 KB, or 32 KB can be seen from the recording/reproduction apparatus 20 depending on the control bits.

OTHER MODIFIED EXAMPLES

The cartridge memory 11 may have a function of performing error detection and correction on the data stored in the memory 36.

The redundancy of data in the cartridge memory 11 or data in communication may be used to make it possible to perform error correction predicting missing data.

Although the case where the recording/reproduction apparatus is a magnetic tape drive has been described in the above-mentioned first embodiment, the recording/reproduction apparatus may be a magnetic tape autoloader or a magnetic tape library apparatus.

Although the case where the recording/reproduction system is a magnetic tape recording/reproduction system has been described in the above-mentioned first embodiment, the recording/reproduction system may be an optical disk recording/reproduction system. Specifically, the cartridge memory and the recording/reproduction apparatus may respectively be an optical disk cartridge and an optical disk recording/reproduction apparatus.

Although the example in which the present disclosure is applied to a drive has been described in the above-mentioned first embodiment, the present disclosure is not limited thereto. For example, the present disclosure may be applied to a servo signal writer, an incorporation device that incorporates a magnetic tape into a cartridge, and an inspection apparatus that inspects the state of a cartridge.

2 Second Embodiment

In a second embodiment, data transfer between the recording/reproduction apparatus 20 and the cartridge memory 11 is performed in a communication mode during motor not driven (third communication mode) in the state where the cartridge 10 has been loaded into the recording/reproduction apparatus 20 and the motor of the recording/reproduction apparatus 20 is not driven. Meanwhile, data transfer between the recording/reproduction apparatus 20 and the cartridge memory 11 is performed in a communication mode during motor driving (fourth communication mode) in the state where the cartridge 10 has been loaded into the recording/reproduction apparatus 20 and the motor of the recording/reproduction apparatus 20 is driven. No error correction code is added to the transfer data in the communication mode during motor not driven but an error correction code is added to the transfer data in the communication mode during motor driving.

The system controller 23 requests the cartridge memory 11 to switch the communication mode. Specifically, the system controller 23 inquires the cartridge memory 11 about whether or not communication is possible in the communication mode during motor driving. In the case where there has been a reply that communication is possible in the communication mode during motor driving from the cartridge memory 11 in response to the inquiry, the system controller 23 requests the cartridge memory 11 to switch the mode from the communication mode during motor not driven to the communication mode during motor driving, and performs, in the communication mode during motor driving, data transfer after the motor is driven. Meanwhile, in the case where there has been a reply that communication is not possible in the communication mode during motor driving from the cartridge memory 11 in response to the inquiry, or in the case where there has been no reply from the cartridge memory 11 in response to the inquiry, the system controller 23 maintains the communication mode during motor not driven.

In the case of stopping the driving of the motor, the system controller 23 requests the cartridge memory 11 to switch the mode from the communication mode during motor driving to the communication mode during motor not driven, and performs data, in the communication mode during motor not driven, transmission after the driving of the motor is stopped.

In the case of transmitting data to the cartridge memory 11 in the communication mode during motor not driven, the system controller 23 transmits, via the reader/writer 21, the data supplied from the external computer 200 via the interface 24 without adding an error correction code thereto. In the case of receiving data from the cartridge memory 11 via the reader/writer 21 in the communication mode during motor not driven, the system controller 23 supplies the received data to the external computer 200 via the interface 24.

In the case of transmitting data to the cartridge memory 11 in the communication mode during motor driving, the system controller 23 generates an error correction code for the data supplied from the external computer 200 via the interface 24, adds the error correction code to the supplied data, and transmits the obtained data via the reader/writer 21. In the case of receiving the data to which an error correction code has been added from the cartridge memory 11 via the reader/writer 21 in the communication mode during motor driving, the system controller 23 tries to detect an error (code error) of the received data by using the error correction code added to the data, corrects, if an error has been detected, the error, and then, supplies the obtained data to the external computer 200 via the interface 24. At this time, the system controller 23 does not necessarily need to perform error correction on the received data, and may supply the data to which an error correction code has been added to the external computer 200 without any change.

The controller 35 has the communication mode during motor not driven and the communication mode during motor driving, and switches between these communication modes in response to a request from the recording/reproduction apparatus 20. In the case where there has been an inquiry about whether or not communication is possible in the communication mode during motor driving from the recording/reproduction apparatus 20, the controller 35 replies to the recording/reproduction apparatus 20 that communication is possible in the communication mode during motor driving.

In the case of receiving data from the recording/reproduction apparatus 20 in the communication mode during motor not driven, the controller 35 stores the received data in the memory 36. In the case where there has been a request for data transmission from the recording/reproduction apparatus 20 in the communication mode during motor not driven, the controller 35 reads the data corresponding to the request from the memory 36, and transmits the read data to the recording/reproduction apparatus 20 without adding an error correction code thereto.

In the case of receiving the data to which an error correction code has been added from the recording/reproduction apparatus 20 in the communication mode during motor driving, the controller 35 tries to detect an error (code error) of the received data by using the error correction code added to the data, corrects, if an error has been detected, the error, and then, stores the obtained data in the memory 36. In the case where there has been a request for data transmission from the recording/reproduction apparatus 20 in the communication mode during motor driving, the controller 35 reads the data corresponding to the request from the memory 36, generates an error correction code for the read data, adds the generated error correction code to the read data, and transmits the obtained data to the recording/reproduction apparatus 20 via the antenna coil 31.

[Switching Operation of Communication Mode]

Figure 7:
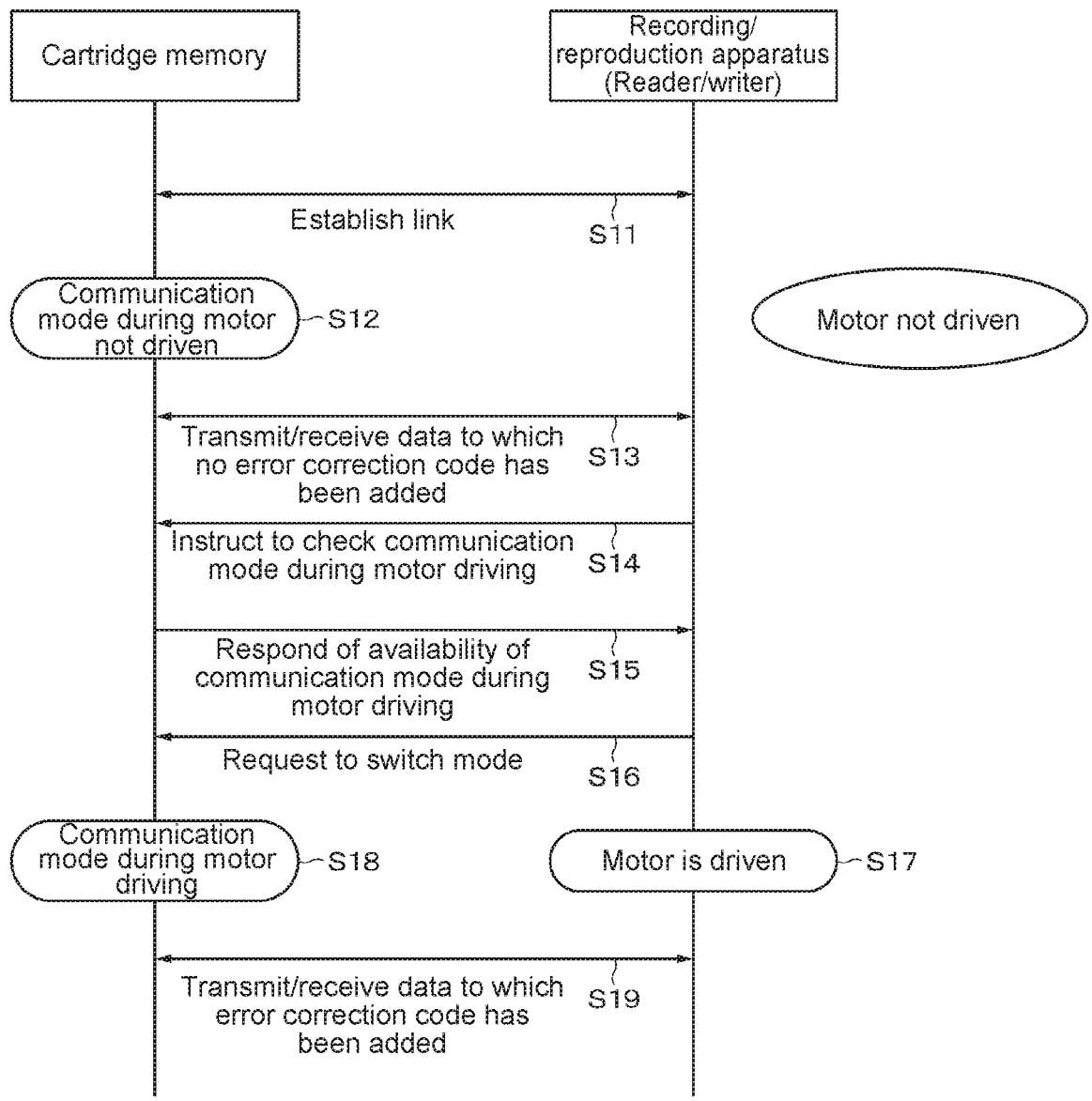
FIG. 7 is a state transition diagram for describing an example of a mode switching operation of a recording/reproduction system according to a second embodiment of the present disclosure.

Hereinafter, an example of the switching operation of the communication mode of the recording/reproduction system 100 will be described with reference to FIG. 7. Note that in the following description, the operations of the cartridge memory 11 and the recording/reproduction apparatus 20 are respectively executed by the controller 35 and the system controller 23.

First, in the case where a link between the cartridge memory 11 and the recording/reproduction apparatus 20 is established (Step S11), the cartridge memory 11 sets the communication mode to the communication mode during motor not driven (Step S12). After that, data exchange between the cartridge memory 11 and the recording/reproduction apparatus 20 is performed in the state where no error correction code is added to the data while the recording/reproduction apparatus 20 does not drive the motor (Step S13).

In the case where the recording/reproduction apparatus 20 inquires, after or in parallel with the above-mentioned exchange of the data, the cartridge memory 11 about whether or not communication is possible in the communication mode during motor driving (Step S14), the cartridge memory 11 replies to the recording/reproduction apparatus 20 that communication is possible or not possible in the communication mode during motor driving (Step S15).

In the case where there has been a reply that communication is not possible in the communication mode during motor driving from the cartridge memory 11 to the recording/reproduction apparatus 20, or in the case where there has been no reply that communication is possible or not possible in the communication mode during motor driving from the cartridge memory 11 to the recording/reproduction apparatus 20, the recording/reproduction apparatus 20 maintains the communication mode during motor not driven. Meanwhile, in the case where there has been a reply that communication is possible in the communication mode during motor driving from the cartridge memory 11 to the recording/reproduction apparatus 20, the recording/reproduction apparatus 20 requests the recording/reproduction apparatus 20 to switch the communication mode from the communication mode during motor not driven to the communication mode during motor driving (Step S16), and drives the motor (Step S17). The cartridge memory 11 that has received the above-mentioned request switches the communication mode from the communication mode during motor not driven to the communication mode during motor driving (Step S18). As a result, data exchange between the cartridge memory 11 and the recording/reproduction apparatus 20 is performed thereafter in the state where an error correction code has been added thereto (Step S19).

[Effect]

In the recording/reproduction system 100 according to the second embodiment, data transfer between the recording/reproduction apparatus 20 and the cartridge memory 11 is performed in the communication mode during motor not driven while the motor of the recording/reproduction apparatus 20 is not driven. Meanwhile, data transfer between the recording/reproduction apparatus 20 and the cartridge memory 11 is performed in the communication mode during motor driving while the motor of the recording/reproduction apparatus 20 is driven. No error correction code is added to the transfer data in the communication mode during motor not driven but an error correction code is added to the transfer data in the communication mode during motor driving. Therefore, it is possible to perform stable data transfer even during motor driving, and write/read the data to/from the cartridge memory 11 even during winding of the magnetic tape MT. Therefore, it is possible to shorten the waiting time for handling the cartridge during loading and unloading.

MODIFIED EXAMPLES

The controller 35 may perform, in the communication mode during motor driving, an operation similar to that in the modified example 1 of the first embodiment.

An error correction code may be added to all pieces of data to be transferred between the recording/reproduction apparatus 20 and the cartridge memory 11 regardless of the communication mode during motor not driven and the communication mode during motor driving.

The communication mode in the first embodiment and the communication mode in the second embodiment may be combined.

Although the first and second embodiments of the present disclosure and the modified examples thereof have been specifically described above, the present disclosure is not limited to the above-mentioned first and second embodiments and the modified examples thereof and various modifications can be made on the basis of the technical idea of the present disclosure.

For example, the configurations, the methods, the steps, the shapes, the materials, and the numerical values cited in the above-mentioned first and second embodiments and the modified examples thereof are only illustrative, and different configurations, methods, steps, shapes, materials, and numerical values may be used as necessary.

Further, the configurations, the methods, the steps, the shapes, the materials, and the numerical values in the above-mentioned first and second embodiments and the modified examples thereof can be combined without departing from the essence of the present disclosure.

Further, the present disclosure may also take the following configurations.

(1)

A cartridge memory used in a magnetic tape cartridge, including:
an antenna unit;
a storage unit that stores data; and
a control unit that reads the data from the storage unit in response to a request from a recording/reproduction apparatus, adds an error correction code to the data, and transmits the obtained data via the antenna unit.

(2)

The cartridge memory according to (1), in which
the control unit
adds, where a motor of the recording/reproduction apparatus is driven, the error correction code to the data and transmits the obtained data via the antenna unit, and transmits, where the motor of the recording/reproduction apparatus is not driven, the data via the antenna unit without adding the error correction code to the data.

(3)

The cartridge memory according to (1) or (2), in which the control unit has
a first communication mode in which the data is transmitted at a first communication speed, and
a second communication mode in which the data is transmitted at a second communication speed higher than the first communication speed,
transmits the data in the first communication mode without adding the error correction code to the data, and
adds the error correction code to the data and transmits the obtained data in the second communication mode.

(4)

The cartridge memory according to any one of (1) to (3), further including
a filter that reduces noise of data received via the antenna unit.

(5)

The cartridge memory according to any one of (1) to (4), in which
the storage unit stores a plurality of the data.

(6)

The cartridge memory according to any one of (1) to (5), in which
the storage unit further stores the error correction code together with the data, and
the control unit reads the data and the error correction code from the storage unit, adds the read error correction code to the read data, and transmits the obtained data via the antenna unit.

(7)

A magnetic tape cartridge comprising the cartridge memory according to any one of (1) to (6).

(8)

A recording/reproduction system, including:
a magnetic tape cartridge including the cartridge memory according to any one of (1) to (6); and
a recording/reproduction apparatus that records/reproduces the magnetic tape cartridge.

(9)

The recording/reproduction system according to (8), in which
the recording/reproduction apparatus is a drive, an autoloader, or a library apparatus.

(10)

The recording/reproduction system according to (8) or (9), in which
the recording/reproduction apparatus includes
a reader/writer, and
a control unit that adds an error correction code to data and transmits the obtained data to the cartridge memory via the reader/writer.

(11)

A method of controlling a cartridge memory used in a magnetic tape cartridge, including:
reading data from a storage unit in response to a request from a recording/reproduction apparatus; and
adding an error correction code to the data, and transmitting the obtained data via an antenna unit.

(12)

A cartridge memory used in a recording medium cartridge, including:
an antenna unit;
a storage unit that stores data; and
a control unit that reads the data from the storage unit in response to a request from a recording/reproduction apparatus, adds an error correction code to the data, and transmits the obtained data via the antenna unit.

REFERENCE SIGNS LIST 10 cartridge
11 cartridge memory
12 cartridge case
12A lower shell 12A
12B upper shell 12B
12C outlet
13 reel
13A reel hub
13B flange
14 reel lock
15 reel spring
16 spider
17 slide door
18 door spring
19 a write protect
20 recording/reproduction apparatus
21 reader/writer
22 recording/reproduction unit
23 system controller
24 interface
31 antenna coil
32 rectifier/power circuit
33 clock circuit
34 detection/modulation circuit
35 controller
36 memory
37 capacitor
38 filter
41 substrate
42 underlayer
43 magnetic layer
44 backcoat layer
100 recording/reproduction system
200 external computer
MT magnetic tape

The invention claimed is:

1. A cartridge memory used in a magnetic tape cartridge, comprising:
an antenna unit;
a storage unit that stores data; and
a control unit that reads the data from the storage unit in response to a request from a recording/reproduction apparatus, adds an error correction code to the data, and transmits the obtained data via the antenna unit,
wherein the control unit
adds, where a motor of the recording/reproduction apparatus is driven, the error correction code to the data and transmits the obtained data via the antenna unit, and
transmits, where the motor of the recording/reproduction apparatus is not driven, the data via the antenna unit without adding the error correction code to the data.

2. The cartridge memory according to claim 1, wherein the control unit has
a first communication mode in which the data is transmitted at a first communication speed, and a second communication mode in which the data is transmitted at a second communication speed higher than the first communication speed, transmits the data in the first communication mode without adding the error correction code to the data, and adds the error correction code to the data and transmits the obtained data in the second communication mode.

3. The cartridge memory according to claim 1, further comprising a filter that reduces noise of data received via the antenna unit.

4. The cartridge memory according to claim 1, wherein the storage unit stores a plurality of the data.

5. The cartridge memory according to claim 1, wherein the storage unit further stores the error correction code together with the data, and the control unit reads the data and the error correction code from the storage unit, adds the read error correction code to the read data, and transmits the obtained data via the antenna unit.

6. A magnetic tape cartridge comprising the cartridge memory according to claim 1.

7. A recording/reproduction system, comprising:

a magnetic tape cartridge including the cartridge memory according to claim 1; and a recording/reproduction apparatus that records/reproduces the magnetic tape cartridge.

8. The recording/reproduction system according to claim 7, wherein the recording/reproduction apparatus is a drive, an autoloader, or a library apparatus.

9. The recording/reproduction system according to claim 7, wherein the recording/reproduction apparatus includes
a reader/writer, and
a control unit that adds an error correction code to data and transmits the obtained data to the cartridge memory via the reader/writer.

10. A method of controlling a cartridge memory used in a magnetic tape cartridge, comprising:

reading data from a storage unit in response to a request from a recording/reproduction apparatus;

adding an error correction code to the data, and transmitting the obtained data via an antenna unit;

adding, where a motor of the recording/reproduction apparatus is driven, the error correction code to the data and transmitting the obtained data via the antenna unit; and transmitting, where the motor of the recording/reproduction apparatus is not driven, the data via the antenna unit without adding the error correction code to the data.

11. A cartridge memory used in a recording medium cartridge, comprising:

an antenna unit;

a storage unit that stores data; and a control unit that reads the data from the storage unit in response to a request from a recording/reproduction apparatus, adds an error correction code to the data, and transmits the obtained data via the antenna unit, wherein the control unit adds, where a motor of the recording/reproduction apparatus is driven, the error correction code to the data and transmits the obtained data via the antenna unit, and transmits, where the motor of the recording/reproduction apparatus is not driven, the data via the antenna unit without adding the error correction code to the data.

12. A cartridge memory used in a magnetic tape cartridge, comprising:

an antenna unit;

a storage unit that stores data; and a control unit that reads the data from the storage unit in response to a request from a recording/reproduction apparatus, adds an error correction code to the data, and transmits the obtained data via the antenna unit, wherein the control unit has
a first communication mode in which the data is transmitted at a first communication speed, and
a second communication mode in which the data is transmitted at a second communication speed higher than the first communication speed, wherein the control unit transmits the data in the first communication mode without adding the error correction code to the data, and wherein the control unit adds the error correction code to the data and transmits the obtained data in the second communication mode.

13. A method of controlling a cartridge memory used in a magnetic tape cartridge, comprising:

reading data from a storage unit in response to a request from a recording/reproduction apparatus;

adding an error correction code to the data, and transmitting the obtained data via an antenna unit;

providing a first communication mode in which the data is transmitted at a first communication speed;

providing a second communication mode in which the data is transmitted at a second communication speed higher than the first communication speed;

transmitting the data in the first communication mode without adding the error correction code to the data; and adding the error correction code to the data and transmits the obtained data in the second communication mode.

14. A cartridge memory used in a recording medium cartridge, comprising:

an antenna unit;

a storage unit that stores data; and a control unit that reads the data from the storage unit in response to a request from a recording/reproduction apparatus, adds an error correction code to the data, and transmits the obtained data via the antenna unit, wherein the control unit has
a first communication mode in which the data is transmitted at a first communication speed, and
a second communication mode in which the data is transmitted at a second communication speed higher than the first communication speed, wherein the control unit transmits the data in the first communication mode without adding the error correction code to the data, and wherein the control unit adds the error correction code to the data and transmits the obtained data in the second communication mode.

* * * * *